US008070905B2

(12) United States Patent  (10) Patent No.: US 8,070,905 B2
Brennan  (45) Date of Patent: Dec. 6, 2011

(54) METHOD OF PRODUCING PERFORATED RETROREFLECTIVE TRIM

(75) Inventor: Christopher John Brennan, Beaumaris (AU)

(73) Assignee: Video Taped Transcripts Pty Ltd., Victoria (AU)

( * ) Notice: Subject to any disclaimer, the term of this patent is extended or adjusted under 35 U.S.C. 154(b) by 594 days.

(21) Appl. No.: 12/090,791

(22) PCT Filed: Jun. 2, 2006

(86) PCT No.: PCT/AU2006/000740
§ 371 (c)(1),
(2), (4) Date: May 23, 2008

(87) PCT Pub. No.: WO2007/045011
PCT Pub. Date: Apr. 26, 2007

(65) Prior Publication Data
US 2008/0252976 A1 Oct. 16, 2008

(30) Foreign Application Priority Data
Oct. 21, 2005 (AU) ................................ 2005905859

(51) Int. Cl.
B29C 65/02 (2006.01)
B32B 37/26 (2006.01)
B32B 38/10 (2006.01)
B32B 43/00 (2006.01)

(52) U.S. Cl. ...................... 156/247; 156/297; 156/308.2
(58) Field of Classification Search .................. 156/63, 156/230, 247, 249, 298, 303.1, 308.2; 264/271.1, 264/277, 1.9, 131; 359/514, 515, 518, 534, 359/535, 536, 538; 428/311.11, 311.51, 428/317.9; 427/180
See application file for complete search history.

(56) References Cited

U.S. PATENT DOCUMENTS

| 3,790,431 | A | * | 2/1974 | Tung .............................. 442/44 |
| 5,207,852 | A | * | 5/1993 | Lightle et al. ................ 156/230 |
| 5,679,435 | A | | 10/1997 | Andriash |
| 6,009,560 | A | | 1/2000 | McKenney et al. |
| 2003/0021030 | A1 | | 1/2003 | Smith |

FOREIGN PATENT DOCUMENTS
EP 0917888 A2 5/1999
WO WO99/31534 A1 6/1999
* cited by examiner

*Primary Examiner* — Philip Tucker
*Assistant Examiner* — Sing P Chan
(74) *Attorney, Agent, or Firm* — Baker & Daniels LLP

(57) ABSTRACT

Perforated retroreflective fabric, trim or tape that comprises a substrate (30) having a first and second sides and a plurality of openings (39) extending between the sides, providing a backing (50) on the first side of the substrate, providing a retroreflective layer (40) on the second side of the substrate, adhering the retroreflective layer to the second side and to the backing through said openings and removing the backing from the first side to strip away the retroreflective layer adhered to the backing through the openings in the substrate.

14 Claims, 4 Drawing Sheets

METHOD OF PRODUCING PERFORATED RETROREFLECTIVE TRIM

CROSS-REFERENCE TO RELATED APPLICATIONS

This is a U.S. National Phase Patent Application based on International Patent Application Serial No. PCT/AU2006/000740 filed on Jun. 2, 2006, the disclosure of which is expressly incorporated by reference herein.

FIELD OF THE INVENTION

The present invention relates to perforated retroreflective trim, perforated retroreflective fabric and perforated retroreflective tape and to a method for producing a perforated retroreflective trim, fabric or tape. For the sake of convenience, the term perforated retroreflective trim is used in the foregoing discussion of the invention, however, it is to be appreciated that the reference to perforated retroreflective trim includes perforated retroreflective fabric or perforated retroreflective tape and may also be a reference to other perforated flexible retroreflective materials, that would benefit from incorporating the principles of the invention.

BACKGROUND OF THE INVENTION

Retroreflective trim is often used in or provided on the outer layer of garments such as fire fighter garments, construction worker garments, road and rail worker garments and jogging suits. Such garments may be referred to as high visibility safety garments. The reason for providing the retroreflective trim is to reflect available light in dark environments so as to enhance the visibility of the garment to which the trim is applied as well as the wearer of the garment.

In some circumstances law mandates that individuals must wear high visibility garments incorporating retroreflective trim material when engaged in certain activities in adverse light conditions or even in light conditions that are not adverse. Such laws often require high visibility safety garments be worn by people in situations where they may be exposed to hazards from moving plant or equipment, motor vehicles, trains etc.

National and international standards are applicable to retroreflective trim used in relation to the aforementioned garments. Such standards specify various minimum requirements for high visibility safety garments and for trim material used in relation to such garments. For example, retroreflective trim applied used in relation to high visibility garments or other objects may be required to meet minimum threshold requirements for visibility, retroreflectivity and other physical performance properties such as abrasion resistance and wear resistance.

The stringent requirements of the standards applicable to retroreflective trim have meant that existing retroreflective trim is formed as a continuous non-permeable, non-perforated sheet which is not breathable. A problem with existing retroreflective trim is that it does not easily permit the transfer of heat or vapour from perspiration emanating from the wearer of a garment incorporating the retroreflective trim. Accordingly, the wearer of the garment is subjected to a build up of heat and vapour within the garment resulting in stress to the wearer. This problem is significant given that while wearing high visibility retroreflective garments the wearers are frequently engaged in strenuous physical activity or are subjected to warm environments.

Another crucial requirement of retroreflective trim is that the retroreflective component, which is usually a retroreflective coating applied to a substrate, must be strongly bound to the underlying substrate. This is so that the retroreflective trim can meet standards requiring the retroreflective component to be resistant to abrasion resulting from when a garment incorporating the retroreflective trim is worn or washed and from general wear and tear. In fact, this property of the retroreflective trim is crucial to its ability to meet standards applicable to such materials. This is because although a retroreflective trim may initially meet the retroreflectivity requirements after a number of wash cycles the adherence of the retroreflective component to the substrate may degrade to the extent that the retroreflective component may separate from the substrate such that the retroreflective trim no longer meets the minimum threshold standards for retroreflectivity.

Previous attempts to provide a breathable retroreflective trim have involved perforating continuous non porous retroreflective trim with perforating needles. However, the perforated retroreflective trim resulting from this process may be insufficient to meet the standards for retroreflective trim such as retroreflectivity, abrasion resistance and wear resistance. The perforated retroreflective trim when used with high visibility garments may not provide adequate breathability and may be ineffective for allowing or enhancing the transport of heat and water vapour emanating from the wearer from within the garment to the external environment outside the garment and ineffective for enhancing the comfort of the wearer. Further, the perforated retroreflective trim may not result in the retroreflective component or coating being strongly bound to the underlying substrate. Perforated trim resulting from using perforating needles may also have poor appearance and quality characteristics and may be relatively inefficient to manufacture.

The above discussion of acts, materials, devices, articles and the like is included in this specification solely for the purpose of providing a context for the present invention. It is not suggested or represented that any of these matters are known, form part of the prior art base or are common general knowledge in the field relevant to the present invention at the priority date of each claim of this application.

Accordingly, there is a need for a breathable retroreflective trim for use with high visibility garments that is sufficient to meet the standards for retroreflective trim such as retroreflectivity and other physical performance properties such as abrasion resistance and wear resistance. There is also a need for a breathable retroreflective trim in which the retroreflective component or coating is strongly bound to the underlying substrate. Furthermore, there is a need for a breathable retroreflective trim that is efficient to produce and that has superior appearance and quality characteristics. There is yet furthermore a need for a method of producing such breathable retroreflective trims.

SUMMARY OF THE INVENTION

Accordingly, in a first aspect the present invention provides a method for producing a perforated retroreflective trim that includes the steps of:

providing a substrate having first and second sides and a plurality of openings extending between the sides;

adhering a continuous retroreflective layer to the second side of the substrate; and removing portions of the retroreflective layer located within the openings of the substrate to provide the perforated retroreflective trim.

Preferably, the method further includes the step of providing a backing on the first side of the substrate before the step of adhering the continuous retroreflective layer to the second side of the substrate such that the retroreflective layer adheres to the second side of the substrate and to the backing within the openings of the substrate so that portions of the retroreflective layer are adhered to the backing through the openings in the substrate. More preferably, the step of removing portions of the retroreflective layer located within the openings of the substrate includes removing the backing from the first side of the substrate to remove from the retroreflective layer the portions of the retroreflective layer adhered to the backing through the openings in the substrate.

In another aspect, the present invention provides a method for producing a perforated retroreflective trim that includes the steps of:

providing a substrate having first and second sides and a plurality of openings extending between the sides;

providing a backing on the first side of the substrate;

providing a retroreflective layer on the second side of the substrate;

adhering the retroreflective layer to the second side of the substrate and to the backing within the openings of the substrate so that portions of the retroreflective layer are adhered to the backing through the openings in the substrate; and removing the backing from the substrate to strip away from the retroreflective layer the portions of the retroreflective layer adhered to the backing within the openings of the substrate to provide the perforated retroreflective trim.

In another aspect, the invention also provides a perforated retroreflective trim produced by the method of the invention. In yet another aspect, the present invention provides a garment incorporating perforated retroreflective trim produced by the method of the invention.

The present invention is advantageous in that it may provide a perforated retroreflective trim that is porous, breathable and suitable for use with high visibility garments for allowing or enhancing the transport of heat and water vapour emanating from the wearer from within the garment to the external environment outside the garment so as to enhance the comfort of the wearer. Another advantage of the method of the invention is that existing materials and equipment may be used in the method to produce a perforated retroreflective trim exhibiting the aforementioned properties. Given that existing components and equipment may be used with the present method the method is cost effective, and economical.

In addition, the invention has resulted in the surprising discovery that the perforated retroreflective trim produced in accordance with the invention may exhibit improvements over perforated retroreflective material produced by existing methods. In particular, the present invention may exhibit improvements in retroreflectivity, abrasion resistance and wear resistance as well as strong binding of the retroreflective layer to the substrate despite the fact that there are openings in the substrate. Furthermore, the invention may result in a perforated retroreflective trim having superior appearance and quality characteristics.

Furthermore, the present invention may enable perforated retroreflective trim to be produced that when incorporated into high visibility garments, provides such high visibility garments with an enhanced ability to meet standards applicable thereto.

Preferably, in the method, the step of providing a retroreflective layer on the second side of the substrate includes providing a retroreflective layer which is a retroreflective heat transfer film.

In a particularly preferred embodiment the step of adhering the retroreflective layer includes heat laminating the retroreflective layer to the substrate and to the backing sheet within the openings of the substrate. This embodiment is particularly advantageous in that existing heat laminating equipment may be used so as to provide a method in accordance with the invention that is cost efficient and economical to adopt. Furthermore, the heat laminated retroreflective layer of this embodiment strongly adheres to the second side of the substrate and to the backing sheet within the openings of the substrate. Accordingly, after the step of removing the backing the heat laminated retroreflective layer strongly adheres to the second side of the substrate, particularly around the edges of the openings in the substrate, thus resulting in a perforated retroreflective trim with the enhanced characteristics of the invention outlined above as well as other benefits that will be evident upon employing the method of the invention.

Preferably, the steps of providing the substrate, the backing and retroreflective layer includes providing the substrate, the backing and retroreflective layer continuously. In another preferred form, the step of adhering the retroreflective layer preferably includes continuously adhering the retroreflective layer to the second side of the substrate and to the backing within the openings of the substrate so that portions of the retroreflective layer are continuously adhered to the backing through the openings in the substrate. In yet another preferred form, the step of removing the backing from the first side of the substrate includes continuously removing the backing from the first side of the substrate to continuously strip away from the retroreflective layer the portions of the retroreflective layer adhered to the backing through the openings in the substrate to continuously provide the perforated retroreflective trim.

Preferably, the method of the present invention includes providing a substrate which is a polyester mesh. In other embodiments the method of the present invention includes providing a backing which may be a backing sheet. The backing may be coated paper, pvc or other man made fabrics or flexible materials. Preferably, the backing sheet is contacted with the first side of the substrate. In yet another embodiment, the step of adhering the retroreflective layer includes heat laminating retroreflective heat transfer film.

In one form, the step of adhering the retroreflective layer includes feeding the substrate, backing and retroreflective layer into a heat press set at a predetermined temperature, for a predetermined time. In another form, the step of adhering the retroreflective layer includes feeding the substrate, backing and retroreflective layer into a heat laminating machine set at a predetermined temperature, for a predetermined time. Preferably, the temperature is 110° C. and the period of time is 15 seconds. Preferably, the method further includes cooling the retroreflective layer before the step of removing the backing.

In another form, the step of removing the backing includes peeling away the backing from the first side of the substrate such that the portions of the retroreflective layer adhered to the backing through the openings of the substrate are thereby pulled out from within the openings to strip away the portions of the retroreflective layer adhered to the backing from the retroreflective layer to provide the perforated retroreflective trim. After removal, the backing is provided with a series of portions of the retroreflective layer heat laminated thereto that substantially correspond with the openings of the substrate.

In another form, the method further includes heating or cooking the retroreflective layer after the step of removing the backing. Preferably, the retroreflective layer and substrate are heated or cooked in a heat press set to a predetermined temperature and for a predetermined time. Preferably, the temperature is 160° C. and the period of time is 25 seconds.

In one form, the present invention provides a strip of perforated flexible retroreflective material produced by the above method. It is to be appreciated, however, that the method of the invention may be used to produce a range of flexible retroreflective materials that, preferably, are able to be incorporated into high visibility garments. In a preferred form, the retroreflective material or trim produced by the above method may be washable.

Preferably, the perforated retroreflective trim meets visibility standards of AS/NZS 1906.4.

The present invention will now be described in more detail with reference to the following preferred embodiments. However, it is to be appreciated that the present invention is not limited the embodiments described in the foregoing as other methods and products incorporating the principles of the invention outlined above may fall within the scope of the invention also.

BRIEF DESCRIPTION OF THE DRAWINGS

The present invention will be further explained with reference to the drawings, wherein:

Referring to FIGS. 4 and 6 there is shown a perforated retroreflective trim 20 produced by the method of the present invention. The perforated trim 20 includes a substrate 30 and a retroreflective layer 40 and holes 25 through the perforated trim 20 which provide the perforated trim 20 with the characteristic of being perforated.

FIGS. 1 to 5 particularly illustrate the method of the invention. As particularly illustrated in FIGS. 1 and 2 the method includes providing the substrate 30 which has a first side 35 and a second side 37 and openings 39 between the sides 35, 37. Subsequently, on the first side 35 of the substrate 30 a backing 50 is provided while on the second side 37 of the substrate 30 a continuous retroreflective layer 40 is provided. With the backing 50 applied to the first side 35 of the substrate 30 a surface 55 of the backing 50 facing the second side 37 of the substrate 30 is accessible from the second side 37 of the substrate 30 through the openings 39 in the substrate 30. The effect of the steps in the method detailed thus far is that the substrate 30 is sandwiched between the backing 50 and the continuous retroreflective layer 40.

Figure 4:
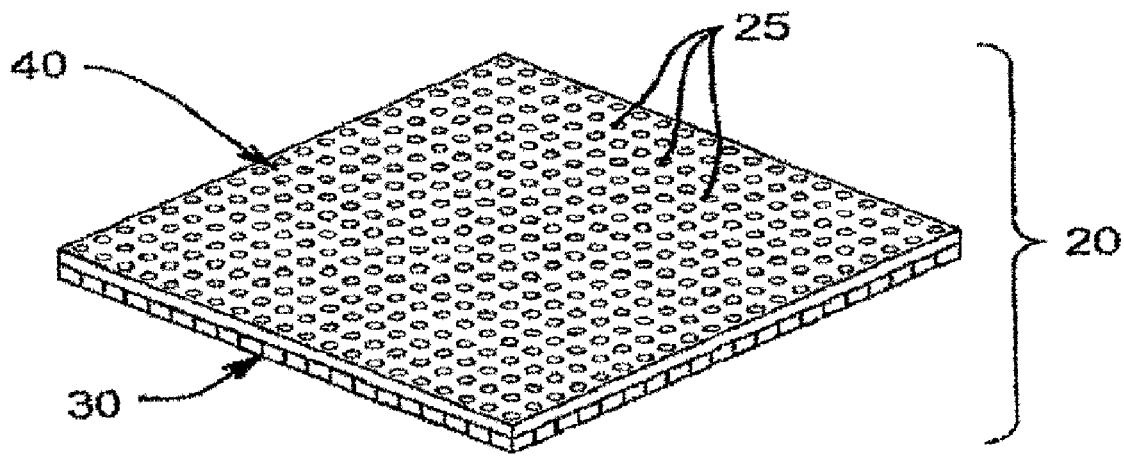
FIG. 4 is a perspective view of perforated trim formed from the method of the invention, the perforated trim including the substrate and retroreflective layer of FIG. 1 with the portions of the retroreflective layer adhered to the backing stripped away from the retroreflective layer.
Figure 5:
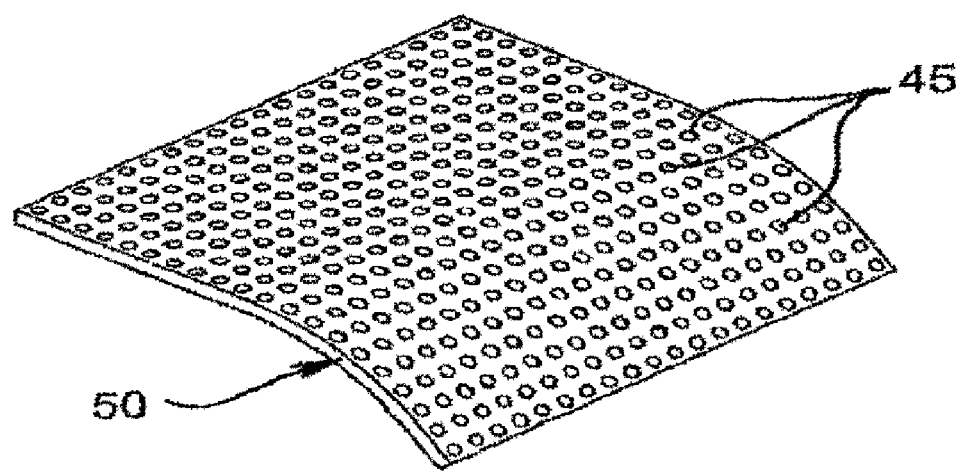
FIG. 5 is a perspective view of the backing of FIG. 1 with the portions of the retroreflective layer adhered to the backing that have been stripped away from the retroreflective layer.
Figure 6:
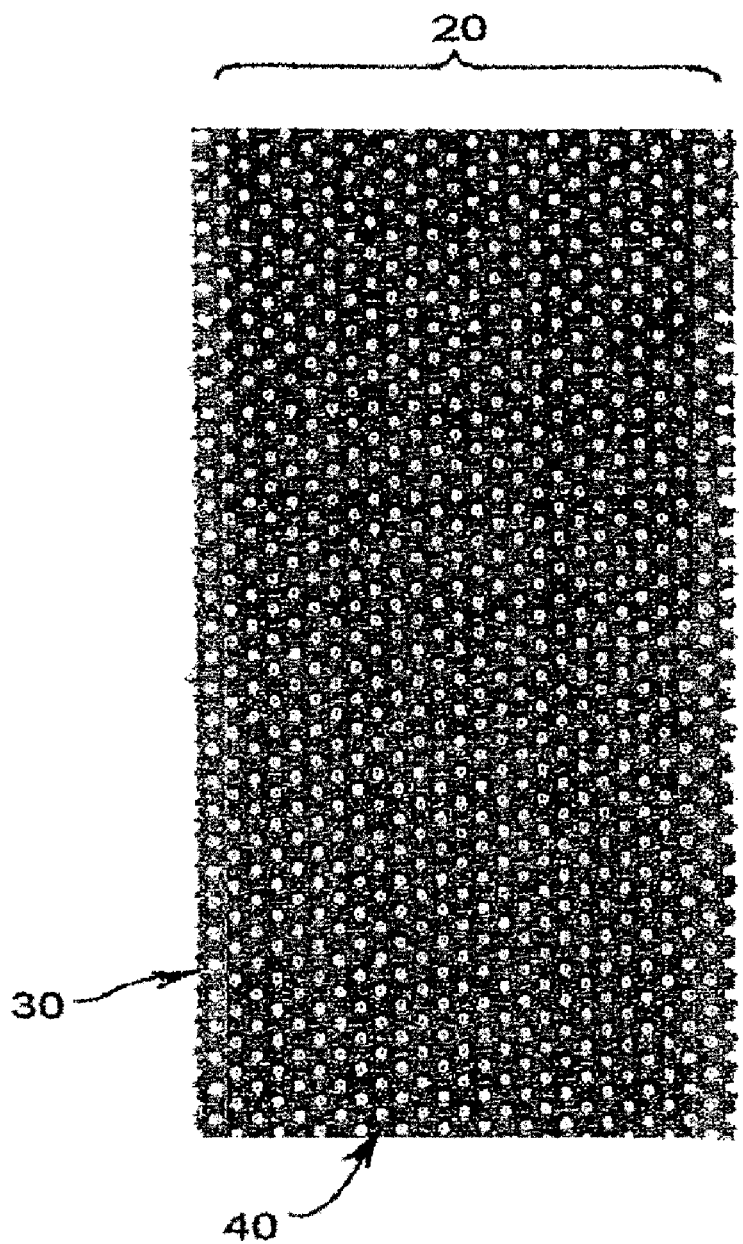
FIG. 6 is a plan view of perforated retroreflective trim formed from the method of the invention, the perforated retroreflective trim including the substrate and retroreflective layer of FIG. 1.

Furthermore, in the method the continuous retroreflective layer 40 can be, and is, adhered to the second side 37 of the substrate 30 as well as to the surface 55 of the backing 50 that is accessible from the second side 37 of the substrate 30 within the openings 39 of the substrate 30. As a result of this step in the method, portions 45 of the continuous retroreflective layer 40 are adhered to the surface 55 of the backing 50 through the openings 39 of the substrate 30. The portions 45 of the retroreflective layer 40 are illustrated in FIG. 5 as adhered to the backing 50 after the subsequent step in the method, which is particularly illustrated in FIG. 3, of removing the backing 50 from the first side 35 of the substrate 30 to strip away from the retroreflective layer 40 the portions 45 of the retroreflective layer 40 adhered to the surface 55 of the backing 50 through the openings 39 of the substrate 30. This final step of the method results in providing the perforated retroreflective trim 20 illustrated in perspective view in FIG. 4 and in plan view in FIG. 6.

In a particularly preferred embodiment of the method of the invention the step of providing the retroreflective layer 40 on the second side 37 of the substrate 30 includes providing a retroreflective layer 40 which is a retroreflective heat transfer film. In an alternate embodiment the step of providing the retroreflective layer 40 on the second side 37 of the substrate 30 includes providing a retroreflective layer 40 which is a retroreflective film or other flexible retroreflective material.

In embodiments of the invention where the retroreflective layer 40 is a retroreflective heat transfer film the step of adhering the retroreflective layer 40 to the second side 37 of the substrate 30 and to the backing 50 within the openings 39 of the substrate 30 includes heat laminating the retroreflective layer 40 to the second side 37 of the substrate 30 and to the backing 50 within the openings 39 of the substrate 30 so that portions 45 of the retroreflective layer 40 are adhered to the backing 50 through the openings 39 of the substrate 30. Such forms of the method are particularly advantageous in that existing heat laminating equipment may be utilised in the method rendering the method cost efficient and economical to adopt. Furthermore, the heat laminated retroreflective layer 40 of this embodiment strongly adheres to the second side 37 of the substrate 30 and to the surface 55 of the backing sheet 50 within the openings 39 of the substrate 30.

Accordingly, after the step of removing the backing 50 the heat laminated retroreflective layer 30 strongly adheres to the second side 37 of the substrate 30, particularly around the edges of the openings 39 in the substrate 30. This results in providing a perforated retroreflective trim 20 that may exhibit enhanced characteristics including improvements in retroreflectivity and/or wear resistance and/or abrasion resistance and/or strong binding of the retroreflective layer 30 to the substrate 30. Furthermore, the method of the invention may result in a perforated retroreflective trim having superior appearance and quality characteristics. Furthermore, the method of the invention may enable perforated retroreflective trim 20 to be produced that when incorporated into high visibility garments, provides such high visibility garments with an enhanced ability to meet standards applicable thereto. Furthermore, the method of the invention may enable perforated retroreflective trim 20 to be produced that is porous, breathable and suitable for use with high visibility garments for allowing or enhancing the transport of heat and water vapour emanating from the wearer from within the garment to the external environment outside the garment so as to enhance the comfort of the wearer.

Preferably, the substrate 30 used in the invention is a polyester mesh that has a plurality of rows and columns of openings 39 passing through the mesh between the first side 35 and second side 37 of the mesh. While a polyester mesh, such as a woven polyester mesh, is preferred, other man made or natural substantially flexible materials may be equally applicable in the invention as the substrate 30 as long as the substrate 30 that is adopted has a plurality of openings 39 therethrough and is adapted to the purpose of the invention.

The backing 50 used in the method of the invention may be coated paper, pvc or other man made fabrics or flexible materials that are suited to the purpose ascribed for the backing 50 in the method. Accordingly, the backing 50 may be any material suited for: being provided to the first side 35 of the substrate 30; adherence by the retroreflective layer 40 within the openings 39 of the substrate 30 so that portions 45 of the retroreflective layer 40 are adhered to the backing 50 within the openings 39 of the substrate 30; and being removed from the first side 35 of the substrate 30 to strip away from the retroreflective layer 40 the portions 45 of the retroreflective layer 40 adhered to the backing 50 within the openings 39 of the substrate 30.

Figure 7:
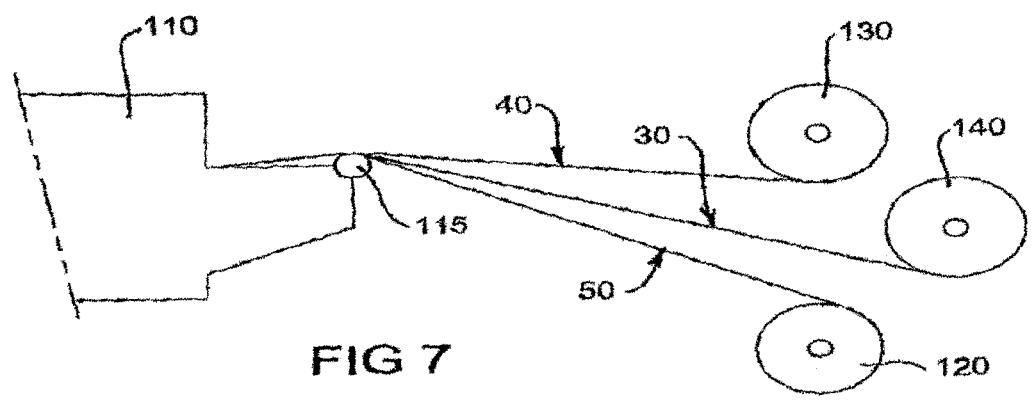
FIG. 7 is a side view of view of the substrate, backing and retroreflective layer of FIG. 1 being fed from rolls of the substrate, backing and retroreflective layer onto a guide where the substrate is sandwiched between the backing and the retroreflective layer and then into a laminating machine in accordance with a preferred form of the method of the invention.

FIG. 7 illustrates a preferred means of carrying out at least part of the method of the invention in which the substrate 30, the backing 50 and the retroreflective layer 40 are respectively fed from a roll 140 of the substrate 30, a roll 120 of the backing 50 and a roll 130 of the retroreflective layer 40 into a laminating machine 110. The laminating machine 110 includes a guide 115 onto which the substrate 30 is sandwiched between the backing 50 and the retroreflective layer 40 before the sandwiched substrate 30, backing 50 and retroreflective layer 40 are fed into the laminating machine 110. The laminating machine 110, may be a heat laminating machine that is suited for heat laminating the retroreflective layer 40 to adhere it to the substrate 30 and to the surface 55 of the backing 50 within the openings 39 of the substrate 30 when the retroreflective layer 40 used in the method is a retroreflective heat transfer film. An alternative to using a heat laminating machine 110 in the method is to feed the substrate 30, the backing 50 and the retroreflective layer 40 into a heat press (not shown). In each case, both the heat laminating machine 110 and the heat press include a heat laminating element (not shown) that is set at a predetermined temperature such that after it is engaged for a predetermined time by the sandwiched substrate 30, backing 50 and retroreflective layer 40, where the retroreflective layer 40 is a retroreflective heat transfer film, the heat laminated retroreflective layer 40 of this embodiment strongly adheres to the second side 37 of the substrate 30 and to the surface 55 of the backing sheet 50 within the openings 39 of the substrate 30. That method of the invention may employ existing heat laminating equipment such as that which is detailed above provides that the invention is cost efficient and economical to adopt.

Furthermore, after the heat laminated retroreflective layer 40 is heat laminated so as to adhere to the second side 37 of the substrate and to the surface 55 of the backing sheet 50 within the openings 39 of the substrate 30 the method may include the additional step of cooling the heat laminated retroreflective layer 40 before the step of removing the backing 50. This ensures that the heat laminated retroreflective layer 40 has sufficiently cured to both the second side 37 of the substrate and to the surface 55 of the backing sheet 50 within the openings 39 of the substrate 30 such that when the backing 50 is removed the portions 45 of the retroreflective layer 40 adhered to the backing 50 within the openings 39 of the substrate 30 are effectively stripped away from the retroreflective layer 40 such that a smooth edge, and strong adherence, is obtained between the retroreflective layer 40 and the substrate 30 at the edge of the openings 39.

In embodiments of the invention where the heat laminating machine 110 or the heat press is employed, the predetermined temperature employed and the predetermined time of engagement with the sandwiched substrate 30, backing 50 and retroreflective layer 40 may vary depending on various factors such as the characteristics of the substrate 30, backing 50 and retroreflective layer 40 employed in the method. Various temperature and time parameters other than those expressly defined herein may nonetheless be suitable for use in embodiments of the invention where they provide adherence of the retroreflective layer 40 to the second side 37 of the substrate 30 and to the surface 55 of the backing sheet 50 within the openings 39 of the substrate 30 and as such may be considered as falling within the scope of embodiments of the invention.

Figure 1:
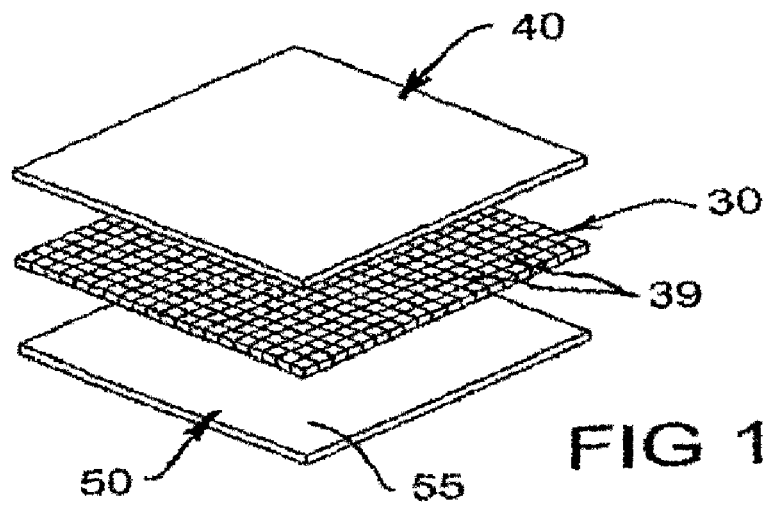
FIG. 1 is an exploded perspective view of the substrate having first and second sides and openings between the sides as well as the backing and the retroreflective layer used in the method of the invention.
Figure 2:
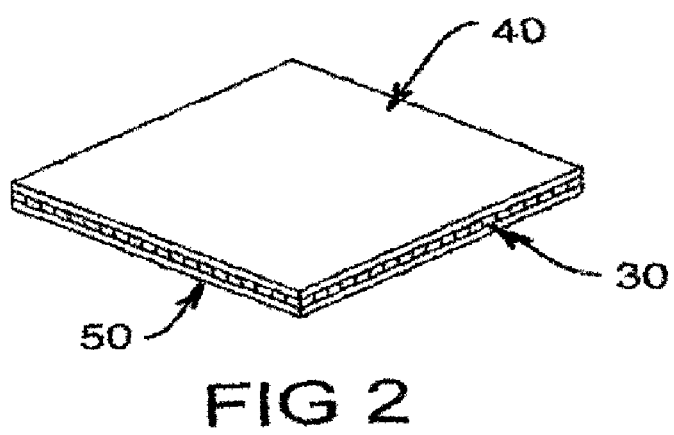
FIG. 2 is a perspective view of the substrate, backing and retroreflective layer of FIG. 1 with the substrate sandwiched between the backing and the retroreflective layer.
Figure 3:
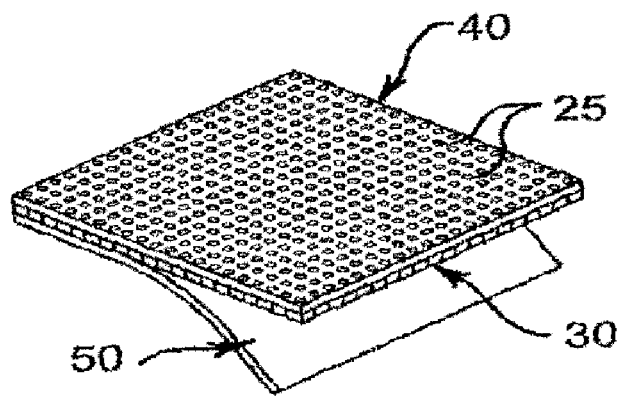
FIG. 3 is a perspective view of the substrate, backing and retroreflective layer of FIG. 1 with the backing being removed to strip away from the retroreflective layer the portions of the retroreflective layer adhered to the backing.

The step in the method of removing the backing 50 is depicted in FIG. 3 where it can be seen the backing 50 is removed by peeling the surface 55 of the backing 50 away from the first side 35 of the substrate 30. This strips away from the retroreflective layer 40 the portions 35 of the retroreflective layer 40 that are adhered to the surface 55 of the backing 50 through the openings 39 of the substrate 30. The peeled away backing 50 having the portions 35 of the retroreflective layer 40 adhered thereto are particularly shown in FIG. 5. The result of this final step of the method is that it provides the perforated retroreflective trim 20 shown in perspective view in FIG. 4 and in plan view in FIG. 6.

Figure 8:
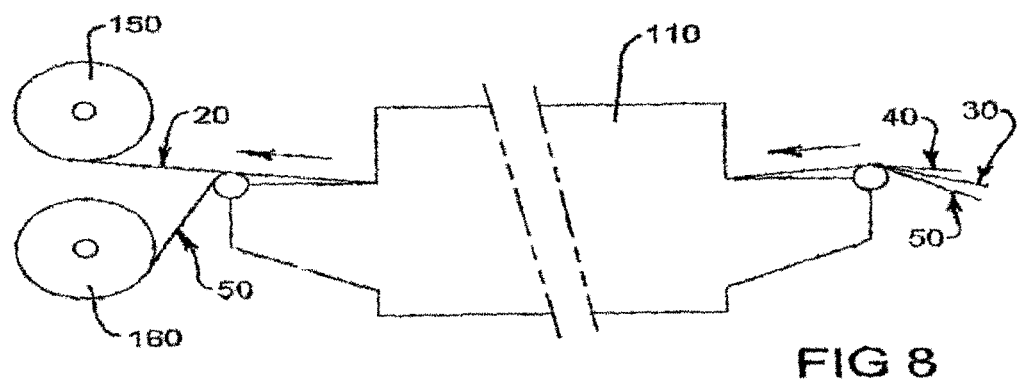
FIG. 8 is a side view of view of the perforated retroreflective trim of FIG. 4 and the backing of FIG. 5 being fed onto rolls after exiting from the laminating machine of FIG. 7 in accordance with a preferred form of the method of the invention.

FIG. 8 illustrates a preferred means of carrying out the step in the method of removing the backing 50. After the substrate 30, the backing 50 and the retroreflective layer 40 are respectively fed into the laminating machine 110 of FIG. 7 where the retroreflective layer 40 which is adhered to the second side 37 of the substrate 30 and to the surface 55 of the backing sheet 50 within the openings 39 of the substrate 30 the retroreflective layer 40, the substrate 30 and the backing sheet 50 are fed out of the laminating machine 110. The backing 50, having adhered thereto the portions 45 of the retroreflective layer 40, diverges from the substrate 30 and the retroreflective layer 40 and feeds onto a roll 160 while the substrate 30 and the retroreflective layer 40, which at this stage of the method form the perforated retroreflective trim 20, similarly feed onto a roll 150. Accordingly, this embodiment of the invention provides for continuous production of the perforated retroreflective trim 20 into a roll 150 which may be conveniently and efficiently stored, packaged and transported. In another form, the present invention may include a further step or steps after the step of removing the backing 50 such as providing further layers and/or coatings. Such layers and/or coatings may include: providing protective layers and/or coatings for providing the perforated retroreflective trim 20 with further resistance to abrasion and wear and tear; providing an adhesive layer for providing a perforated retroreflective trim 20 in a form that is capable of being adhered to a surface or object; and providing a porous lining in face to face contact with the first side of the substrate 30 of the perforated retroreflective trim 20.

The above embodiments of the method of the invention enable: continuous formation of the perforated retroreflective trim 20 by enabling continuous provision of the substrate 30, the backing 50 and retroreflective layer 40; continuous adhering of the retroreflective layer 40 to the second side 37 of the substrate 30 and to the surface 55 of the backing 50 within the openings 39 of the substrate 30 so that portions 45 of the retroreflective layer 40 are continuously adhered to the backing 50 within the openings 39 in the substrate 30; and continuous removal of the backing 50 from the first side 35 of the substrate 30 to continuously strip away from the retroreflective layer 40 the portions 45 of the retroreflective layer 40 adhered to the backing 50 within the openings 39 in the substrate 30 so as to continuously provide the perforated retroreflective trim 20.

In a preferred form of the method, after the step of removing the backing 50 the method further includes heating or cooking the retroreflective layer 40. Preferably, the retroreflective layer 40 and substrate 30 are heated or cooked in a heat press set to a predetermined temperature and for a predetermined time. Preferably, the temperature is 160° C. and the period of time is 25 seconds.

EXAMPLE

Reflective trim material was produced by employing the method of the invention which involved providing a 58 millimeter polyester mesh substrate, providing a PVC backing sheet on the first side of the substrate, providing a 50 millimeter retroreflective heat transfer film on the second side of the substrate, placing the sandwich of the substrate, backing and retroreflective heat transfer film in a heat press set to a temperature of 110° heating the sandwich for 15 seconds. The sandwich was removed and then allowed to cool. After cooling, the backing was removed and the portions of the retroreflective layer adhered to the backing within the openings of the substrate were stripped away to provide the perforated retroreflective trim. The perforated retroreflective trim was then cooked in the heat press set to a temperature of 160° for 25 seconds.

While the above detailed description of the invention details various preferred and envisaged embodiments of the invention it is to be appreciated that there may be other embodiments that incorporate the principles and/or spirit of the invention that have not been described either because they are not preferred or have not been envisaged and that such embodiments ought to be considered to be within the scope of the invention disclosed herein.

The claims defining the invention are as follows:

1. A method for producing a perforated retroreflective trim, the method including the steps of:
providing a substrate having first and second sides and a plurality of openings extending between the sides;
adhering a continuous retroreflective layer to the second side of the substrate;
removing portions of the retroreflective layer located within the openings of the substrate to provide the perforated retroreflective trim; and providing a backing on the first side of the substrate before the step of adhering the continuous retroreflective layer to the second side of the substrate such that the retroreflective layer adheres to the second side of the substrate and to the backing within the openings of the substrate so that portions of the retroreflective layer are adhered to the backing through the openings in the substrate.

2. The method of claim 1, wherein the steps of providing the substrate and the backing and the step of adhering the retroreflective layer include providing the substrate and providing the backing and adhering the retroreflective layer continuously.

3. The method of claim 1, wherein the step of adhering the retroreflective layer includes continuously adhering the retroreflective layer to the second side of the substrate and to the backing within the openings of the substrate so that portions of the retroreflective layer are continuously adhered to the backing through the openings in the substrate.

4. The method of claim 1, wherein the step of removing portions of the retroreflective layer located within the openings of the substrate includes removing the backing from the first side of the substrate to remove from the retroreflective layer the portions of the retroreflective layer adhered to the backing through the openings in the substrate.

5. The method of claim 4, wherein the step of removing the backing includes peeling away the backing from the first side of the substrate to pull out the portions of the retroreflective layer adhered to the backing through the openings of the substrate to provide the perforated retroreflective trim.

6. The method of claim 4, wherein the method further includes cooling the retroreflective layer before the step of removing the backing.

7. The method of claims 4, wherein the method further includes heating the retroreflective layer after the step of removing the backing.

8. The method of claim 4, wherein the step of removing the backing from the first side of the substrate includes continuously removing the backing from the first side of the substrate to continuously strip away from the retroreflective layer the portions of the retroreflective layer adhered to the backing through the openings in the substrate to continuously provide the perforated retroreflective trim.

9. The method of claim 1, wherein the step of adhering the retroreflective layer includes heat laminating the retroreflective layer.

10. The method of claim 1, wherein the step of adhering the retroreflective layer includes feeding the substrate, backing and retroreflective layer into a heat laminating machine set at a predetermined temperature, for a predetermined time.

11. The method of claim 1, wherein the step of adhering the retroreflective layer includes adhering a retroreflective heat transfer film to the second side of the substrate.

12. The method of claim 1, wherein the substrate is a polyester mesh.

13. The method of claim 1, wherein the backing is selected from a group that includes coated paper, pvc and an elastomer.

14. A method for producing a perforated retroreflective trim wherein the method includes the steps of:
providing a substrate having first and second sides and a plurality of openings extending between the sides; providing a backing on the first side of the substrate;
providing a retroreflective layer by a step of adhering the retroreflective layer to the second side of the substrate and to the backing within the openings of the substrate so that portions of the retroreflective layer are adhered to the backing through the openings in the substrate; and
removing the backing from the first side of the substrate to strip away from the retroreflective layer the portions of the retroreflective layer adhered to the backing through the openings in the substrate to provide the perforated retroreflective trim.

* * * * *